(12) United States Patent
Virciglio, Jr.

(10) Patent No.: US 10,419,733 B2
(45) Date of Patent: Sep. 17, 2019

(54) SYSTEMS FOR CREATING AND DISPLAYING REAL-TIME INTERACTIVE VIRTUAL STAGE IMAGERY USING THREE DIMENSIONAL STEREOSCOPIC PROJECTIONS

(71) Applicant: John B. Virciglio, Jr., Hoover, AL (US)

(72) Inventor: John B. Virciglio, Jr., Hoover, AL (US)

( * ) Notice: Subject to any disclaimer, the term of this patent is extended or adjusted under 35 U.S.C. 154(b) by 0 days.

(21) Appl. No.: 15/748,191

(22) PCT Filed: Jul. 30, 2016

(86) PCT No.: PCT/US2016/044934
§ 371 (c)(1),
(2) Date: Jan. 28, 2018

(87) PCT Pub. No.: WO2017/020032
PCT Pub. Date: Feb. 2, 2017

(65) Prior Publication Data
US 2018/0227552 A1    Aug. 9, 2018

Related U.S. Application Data

(60) Provisional application No. 62/198,745, filed on Jul. 30, 2015.

(51) Int. Cl.
*H04N 9/31*    (2006.01)
*H04N 21/41*    (2011.01)
(Continued)

(52) U.S. Cl.
CPC ........... *H04N 9/3147* (2013.01); *G02B 27/26* (2013.01); *H04N 13/363* (2018.05);
(Continued)

(58) Field of Classification Search
CPC ........ G03B 21/00; G03B 21/10; G03B 21/62; G03B 21/2033; G03B 21/562;
(Continued)

(56) References Cited

U.S. PATENT DOCUMENTS

2013/0176539 A1* 7/2013 Kilcher ................ H04N 9/3129
353/10
2013/0250184 A1* 9/2013 Leclerc ..................... A63J 5/02
348/744

\* cited by examiner

*Primary Examiner* — Sultan Chowdhury

(57) ABSTRACT

Stereoscopic systems, using active and passive three dimensional ("3D") projection for creating and displaying interactive, real-time virtual stage sets, are disclosed. In one embodiment, the system uses a plurality of projectors displaying on a plurality of on-set screens, along with at least one computer processor for controlling the projectors and for maintaining, uploading, and streaming various stage set virtual imagery. The system is designed to be fully customizable for use with live stage productions, concerts, entertainment attractions, and similar events. Further, methods for innovatively using stereoscopic 3D projection technology, including both passive and active 3D visuals, in order to create an interactive, virtual environment for stage performers in real-time, are disclosed. At the core, the methods and systems apply an innovative architecture and structure for strategically placing front and rear stage projection 3D screens in conjunction with precise placement of a plurality of high lumen powered projectors.

14 Claims, 8 Drawing Sheets

(51) Int. Cl.
*G02B 27/26* (2006.01)
*H04N 21/81* (2011.01)
*H04N 13/363* (2018.01)
*H04N 13/30* (2018.01)

(52) U.S. Cl.
CPC ....... *H04N 21/4122* (2013.01); *H04N 21/816* (2013.01); *H04N 2013/405* (2018.05)

(58) Field of Classification Search
CPC ........ G03B 35/00; G03B 35/04; G03B 35/16; G03B 35/20; H04N 21/816; H04N 21/4122
See application file for complete search history.

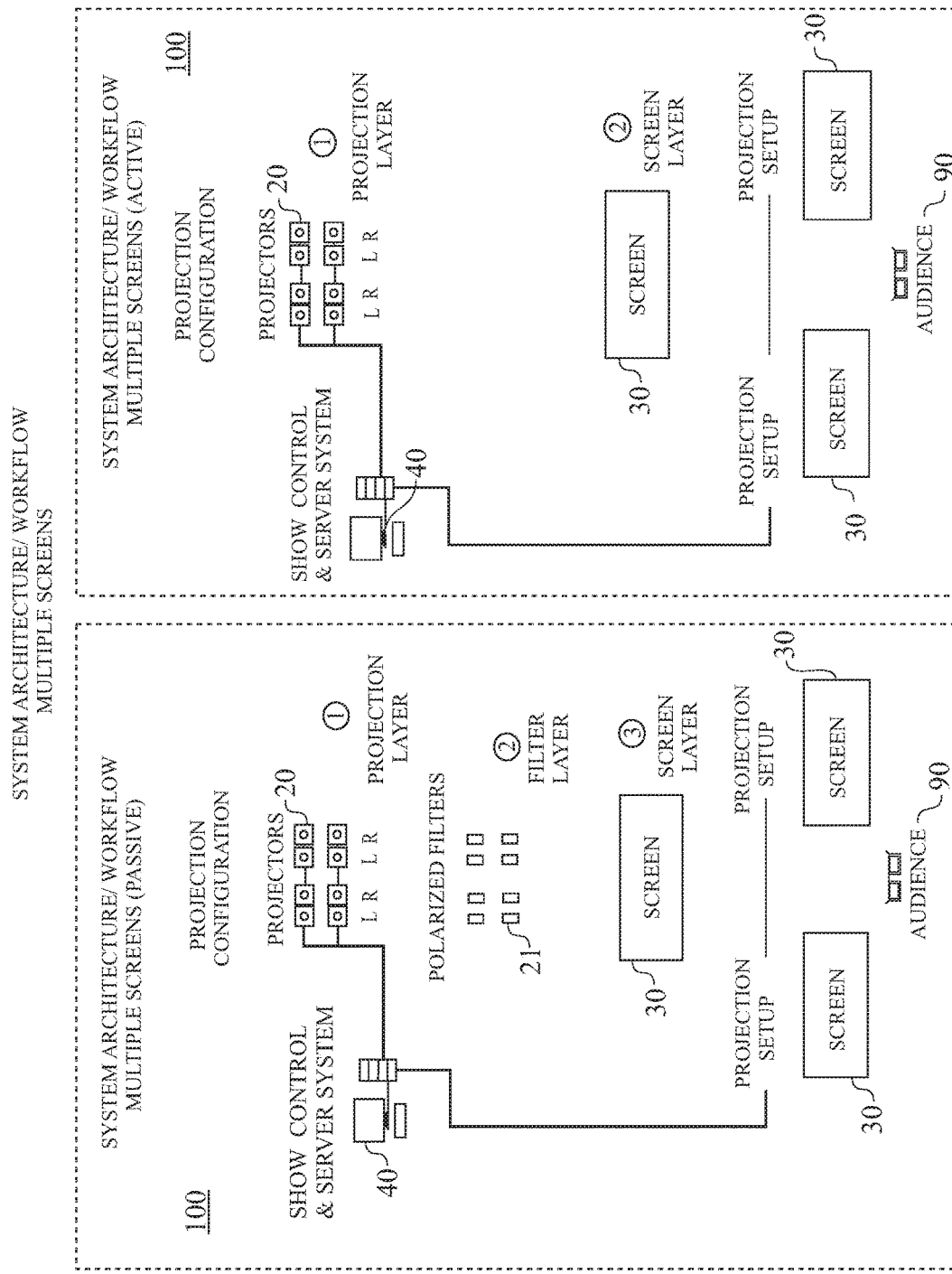

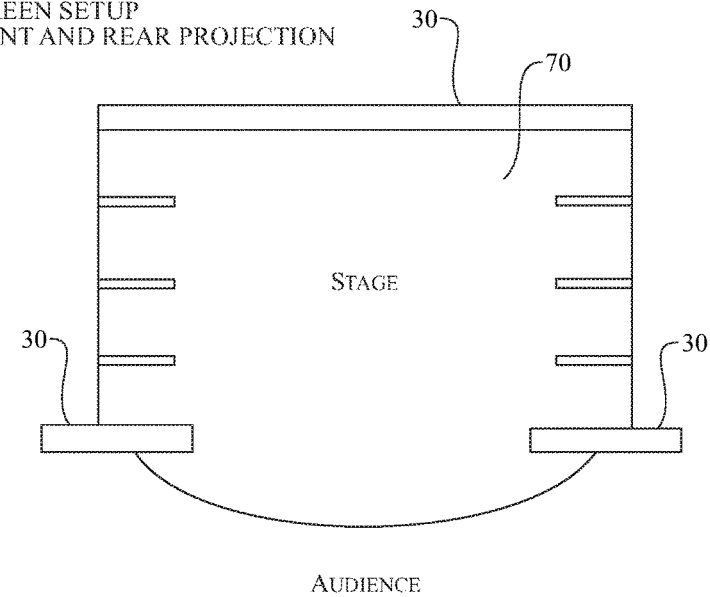
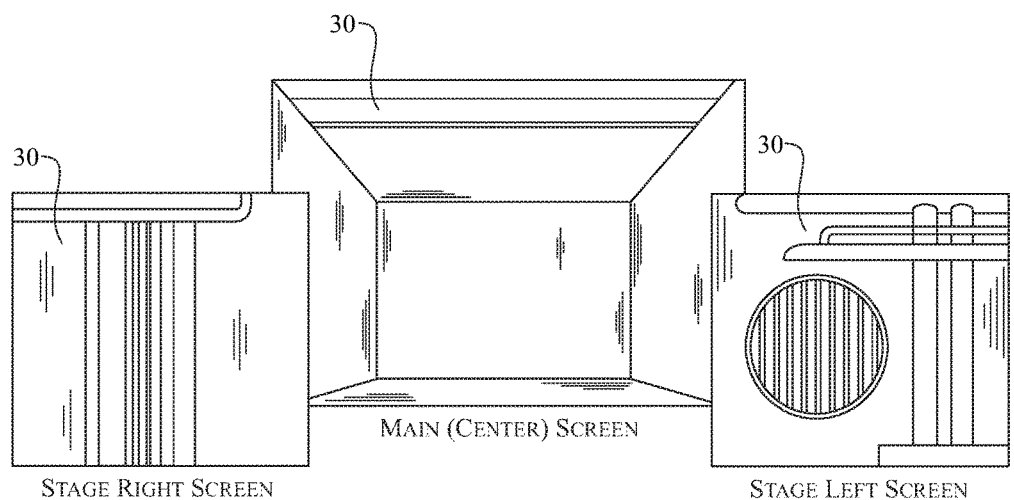
FIG. 8

SYSTEMS FOR CREATING AND DISPLAYING REAL-TIME INTERACTIVE VIRTUAL STAGE IMAGERY USING THREE DIMENSIONAL STEREOSCOPIC PROJECTIONS

CLAIM OF PRIORITY

This application claims the benefit of priority under 35 U.S.C. § 119(e) from U.S. Provisional Patent Application Ser. No. 62/198,745, filed on Jul. 30, 2015, the benefit of priority of which is claimed hereby, and the contents of which are incorporated by reference herein in its entirety as if set forth in full.

FIELD OF THE INVENTION

The present invention generally relates to projection systems used for events and attractions. In more particularity, embodiments of the inventive system are stereoscopic systems, using active and passive three dimensional ("3D") projection for creating and displaying interactive, variable real-time virtual stage sets. In one embodiment, the system uses a plurality of projectors displaying on a plurality of on-set screens, along with at least one computer processor with associated memory for controlling the projectors and for maintaining, uploading, and streaming various stage set virtual imagery. The audience members are provided polarizing and active glasses to ensure they are seeing proper presentation of the 3D visuals and content. Further, other embodiments of the invention are methods for innovatively using stereoscopic 3D projection technology, including both passive and active 3D visuals, in order to create an interactive, virtual environment for stage performers in real-time.

BACKGROUND DESCRIPTION OF THE SYSTEMS AND METHODOLOGIES

Stage performances in the form of theatre, music concerts, night clubs, touring shows, live events and commercials, marketing and sales pitches, and Broadway productions have been alluring and drawing in audiences for centuries. Audiences, no matter how big or small thoroughly enjoy being entertained. Audiences also enjoy performances and presentations that provide enhanced visuals. Simulators used in amusement parks are a recent example of enhanced or immerse entertainment visuals. Moreover, in amusement parks and other locales, enhanced entertainment visuals are being provided during line-cues for patrons waiting to enter the subject event. In response, some stage performances, music concerts, simulations (for both entertainment and training purposes), touring shows, and even marketing and sales presentations have become very complex, very intricate, and accordingly, very expensive.

The size, intricacy, and complexity of some presentation sets and shows impose many substantial restrictions on where and how such presentations may be offered to audiences. For example, there are limitations on available space, on budget, and often times, on available technology. By way of just two examples, certain large production music concerts as well as stage touring performances are only able to be shown in certain limited locations because of constraints in space, budget, and the, often times, substantial mechanical and electronic complexity required to create, build up, take down, and transport the set.

As noted, even traditional smaller stage or smaller performance sets, including theatre productions, musical concerts, and marketing booths, can be expensive to build and maintain. When such sets are transported for traveling shows, the wear and tear on the physical elements during buildup and tear down can be substantial. Such sets are in constant need for repair, upkeep, touchup, or possible replacement. Where the set is large or complex, whether such complexity is mechanically and/or electronically, the transport and storage of the set components can be unwieldy and expensive.

Obviously part of the expense and difficulty in creating, using, and managing elaborate and complex physical stage sets is the need for qualified staff and set workers to handle all of the needs of such equipment. As such, the labor force to oversee a complex stage set, including maintenance, repair, inventory, and transport can be a very substantial additional resource requirement for a production. Because of such limitations and incumbent constraints, often a show is not offered for presentation, or the show visuals are substantially compromised in order to meet the imposed limitations and constraints.

What is needed are systems and methods using the most current advances in projection and visual technologies, that are capable of creating and displaying three-dimensional stereoscopic visuals in real-time to an audience such that the audience is provided with an enhanced immersed-like presentation. While certain examples of systems and methods have been developed and attempted to be used, such systems each have several flaws or issues which substantially detract from the desired purpose of improving the audience sense of being "in the show."

SUMMARY OF THE INVENTION

The present invention overcomes the disadvantages of the prior art and fulfills the needs described above by providing a system for creating and displaying three-dimensional stereoscopic projections for use in a variety of live events using either passive or active filtering and projection elements.

A preferred embodiment of the invention is a system for creating and displaying real-time, three-dimensional stereoscopic projections for use in live events, said system comprising (a) a plurality of on-stage screens configured to provide a fully aligned behind-stage image, an at stage-stage image, and a forward-stage image; (b) a plurality of projectors arranged in a plurality of pairs to project consistent content images on said plurality of on-stage screens; and (c) at least one processor controlling said plurality of projectors; such that the set display observable by an audience is dynamic, interactive, updated in real-time, and appears to envelope on-stage performers, and further appears to immerse audience members in the stage set.

Another preferred embodiment of the above system for creating and displaying real-time, three-dimensional stereoscopic projections further provides that content of said set display presented in part as said fully aligned behind-stage image, an at stage-stage image, and a forward-stage image is fully modifiable for presentation specifications, to suit specific stage physical constraints, and tuned to specific audience viewing positions.

A further embodiment of the invention is a system for creating and displaying real-time, three-dimensional stereoscopic projections for use in live events having a stage section, said system comprising (a) a plurality of on-stage light emitting diode (LED) displays interconnected and configured to provide a fully aligned behind-stage image, an at stage-stage image, and a forward-stage image, and (b) at least one processor controlling said plurality of LED displays, such that said stage display observable by an audience is dynamic, interactive, updated in real-time, and appears to envelope on-stage performers, and further appears to immerse audience members in said stage section.

Another preferred embodiment of the above system for creating and displaying real-time, three-dimensional stereoscopic projections using LED displays further provides that the content of said set display presented in part as said fully aligned behind-stage image, an at stage-stage image, and a forward-stage image is fully modifiable for presentation specifications, to suit specific stage physical constraints, and tuned to specific audience viewing positions.

BRIEF DESCRIPTION OF THE DRAWINGS

For the purposes of illustrating the invention, the attached drawings show certain aspects and embodiments that are presently preferred. However, it should be understood that the invention is not limited to the precisely illustrated architecture, structure, or methodology as may be shown in the accompanying drawings.

FIG. 1A is a system illustration of an exemplary embodiment of the component architecture incorporating multiple screens for passive systems.

FIG. 1B is a system illustration of an exemplary embodiment of the component architecture incorporating multiple screens for active systems.

FIG. 8 is an overhead illustration of another exemplary embodiment of a three-screen system configuration using front and rear projectors to present a real-time 3D stereoscopic display, and showing the placement of the front and rear screens, and further showing an example image on the front and rear screens as viewed from an audience position.

DETAILED DESCRIPTION OF CERTAIN EMBODIMENTS

Innovative systems and system configurations for creating and displaying virtual, live performance, real-time, and interactive environments using passive or active 3D stereoscopic technology are described. In view of the above noted problems relating to the complexity of building, using, and transporting stage sets, a significant improvement, and revolutionary solution to such problems may be made through the use of virtual displays. Such virtual displays include holograms, as well as through the use of stereoscopic three dimensional ("3D") imagery.

While stereoscopic 3D imagery has been used for years, the disclosed methods and systems present an innovative structure and repurposed use of passive and/or active stereoscopic 3D projection to create a fully interactive, real-time, virtual environment for live and pre-recorded performances. Through use of the innovative methods and system, a more cinematic and interactive experience for both performers and patrons is presented, as the 3D images appear to "pop off" of the screen and envelope the on-stage performers.

A key component and objective of the disclosed innovation is the ability to quickly and efficiently create and present visual imagery (including interactive scene renderings) that may be custom designed for different shows, stages, or presentations. The disclosed methods and systems are applicable and may be implemented for various 3D imagery created using most any form of 3D projection technology, including but not limited to active, passive (including both circular and linear filter systems), or anaglyph systems.

The inventive systems and methods may also be used in conjunction with a variety of projection setups, including but not limited to, rear and/or front projection, single or multiple screens, curved and/or domed screens, LED (light emitting diode) display walls, active or passive stereoscopy displays, single or multiple projectors using active lenses, or multiple projectors using passive filters and lenses.

Figures 2A, 2B:
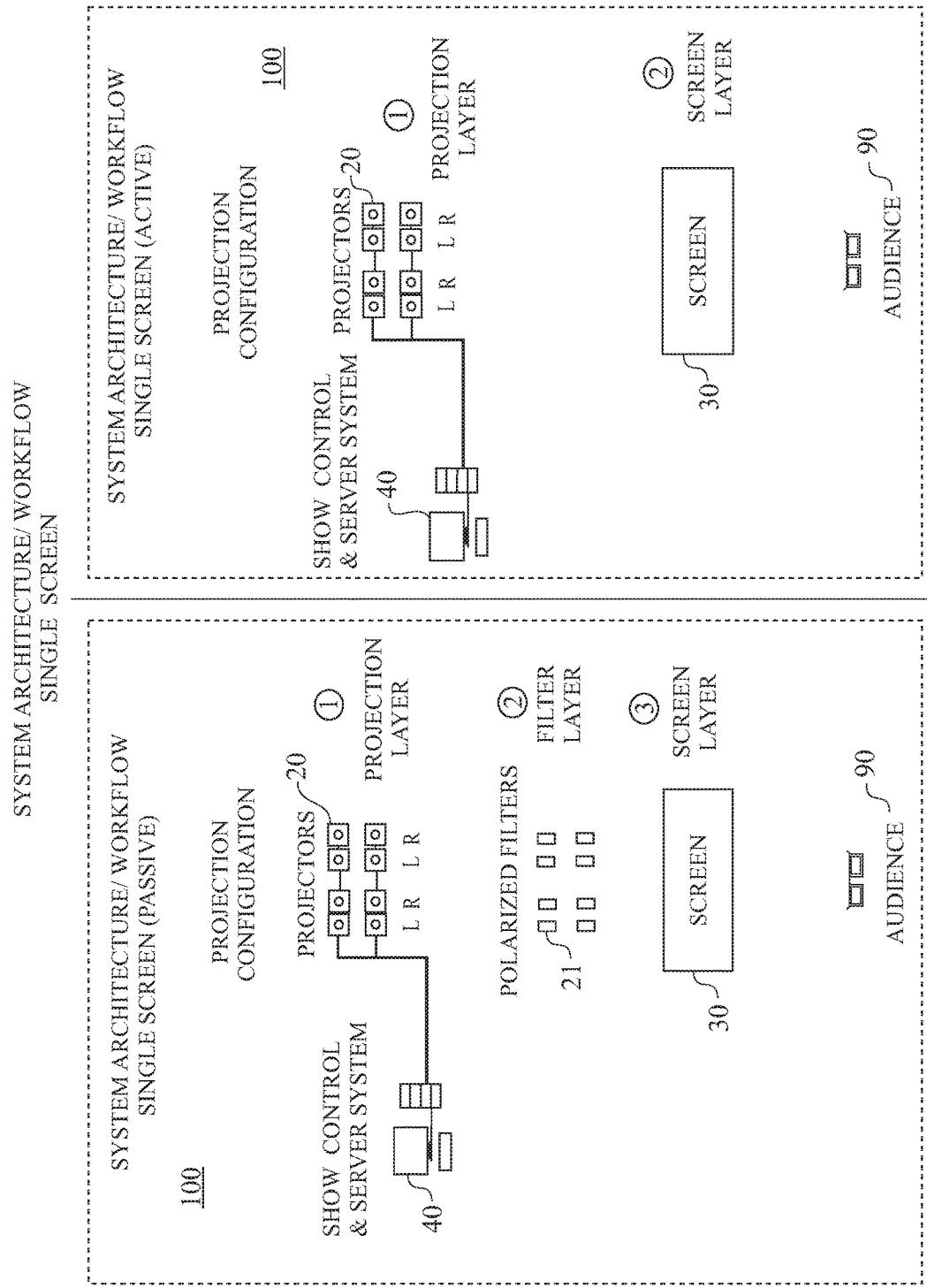
FIG. 2A is a system illustration of an exemplary embodiment of the component architecture and data flow for a single screen system for passive systems.
FIG. 2B is a system illustration of an exemplary embodiment of the component architecture and data flow for a single screen system for active systems.

In one embodiment for passive projection systems, as schematically shown in FIGS. 1A and 2A, the inventive system 100 is comprised of three layers: a projection layer, a filter layer, and finally, a screen. For active system, as schematically shown in FIGS. 1B and 2B, the inventive system 100 is comprised of two primary layers: a projection layer, and a screen layer. The system 100 more particularly includes a plurality of high powered, high-quality projectors 20 presenting images on a plurality of screens 30 strategically placed at various positions on a stage area 70, and at least one processor or server 40 controlling the display output of the projectors. As compared to the FIGS. 1A and 1B configurations each having multiple screens 30, the FIGS. 2A and 2B configurations show an architecture having a single screen 30 or single wall of screens 30. As explained in further detail below, and shown in side-by-side comparison for FIGS. 1A and 1B, and FIGS. 2A and 2B, the system configurations do apply to either active or passive system operations. As schematically shown in FIGS. 1A and 2A, for the passive systems, projection filters and appropriate audience glasses are used to ensure proper operation and viewing of the displays.

In further detail, the FIG. 1A embodiment of the system includes and uses the strategic placement of front-projection and/or rear-projection 3D screens in combination with a plurality of greater than 30,000 lumen projectors that are similarly strategically placed relative to the plurality of 3D screens, with each projector 20 presenting its display through a circular polarized filter 21, and each projector 20 further being controlled by at least one processor or server system 40 to network or stitch together, or projection map, the plurality of projectors 20, and to frame-sync the display content. Using such a structure and architecture, two display streams of content, one for the left eye and one for the right eye, are presented to the viewing audience. To properly see the two display streams, each audience member views the stage 70 through circular active polarizing glasses 90 to provide a blended 3D image. In different embodiments, the polarizing filters are set to be either 45 degrees or 90 degrees. Further, the polarizing filters may specifically be glass circular filters.

Example 1—Passive Projection

For a passive projector/screen embodiment, the 3D projection screens 30 are positioned strategically in the front and/or rear of the stage 70 as illustrated in FIG. 1A. Through such placement of the screens 30 and the imagery/content displayed thereon, the framework or set outline for the stage 70 is created. In such an embodiment, multiples of projector 20 pairs (one left eye and one right eye) are positioned, and the displays are stitched together and superimposed over each other by the processor to create a seamless, panoramic image. Each such projector 20 uses a polarizing filter 21, typically a circular polarizing filter, through which the display is transmitted. The processor 40, or show server, should have multiple outputs, and should be capable of frame-syncing the projectors 20 to provide two separate channels, being left eye and right eye content streams, that are superimposed over each other. Each content stream may include both fixed or still, as well as dynamic or moving content. FIG. 1B shows a similar configuration for an active system, and accordingly does not include a polarizing filter 21.

Because multiple projector pairs, and thus multiple channel or content streams are used to produce the desired content and imagery, it should be noted that additional content, including active or dynamic content may be layered into the scene, such as a bird, or clouds, or a ghost, through use of one or more of the projector channel streams. Through the use of such layering, further scene variety and dynamics are achieved to enhance the event presentation.

Figure 3:
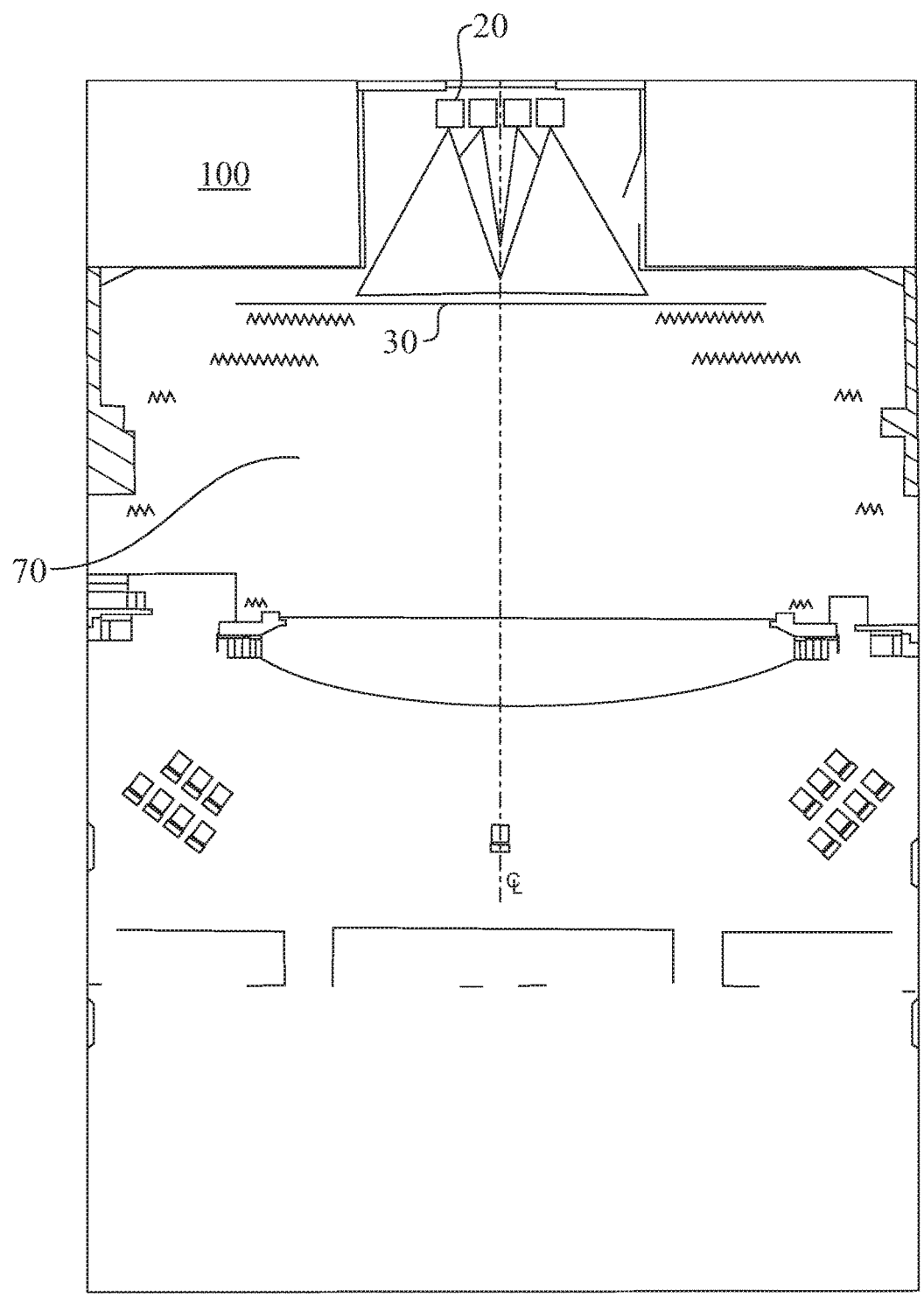
FIG. 3 is an overhead illustration of an exemplary embodiment of a configuration and architecture for a plurality of screens and rear positioned projectors used to present a real-time 3D stereoscopic display.

FIG. 3 illustrates one example of a projector/single screen architecture using four pairs of rear positioned projectors 20. In this example, 90-degree circular polarized, glass filters 21 were placed in front of each of the eight projectors. Further, each audience member would be provided and would wear a pair of passive, circular polarized 3D glasses 90 to ensure the proper image is presented to each eye of the audience member, as well as being able to see consistent immersed 3D visuals.

While for this stage set up, eight projectors were used, for different stage presentations or shows, the type, number and power of the projectors 20 may be readily revised. More particularly, the projector type, number of projectors, and the required power for the projectors is a function of the needs of the stage presentation or show. Further, as expected, the content for each stage presentation would be specifically designed for that show's needs based up on design specifications, theatre measurements, stage measurements, and the audience sweet spot. The audience sweet spot would generally vary for each theatre and/or stage presentation.

Example 2—Passive LED Wall

For a passive LED wall embodiment, the configuration comprises multiple passive LED panels or tiles that are connected together side-by-side, and top to bottom, to create a display wall that has the desired screen size for the stage configuration and dimensions. Essentially the above noted screens 30 are substituted with LED walls or panels 33. The LED panels 33 are driven by software that is well-known and generally is provided with the LED panels or tiles. Such software needs to communicate with and be compatible with the control server software and programs to ensure proper display projection and timing.

Figure 5:
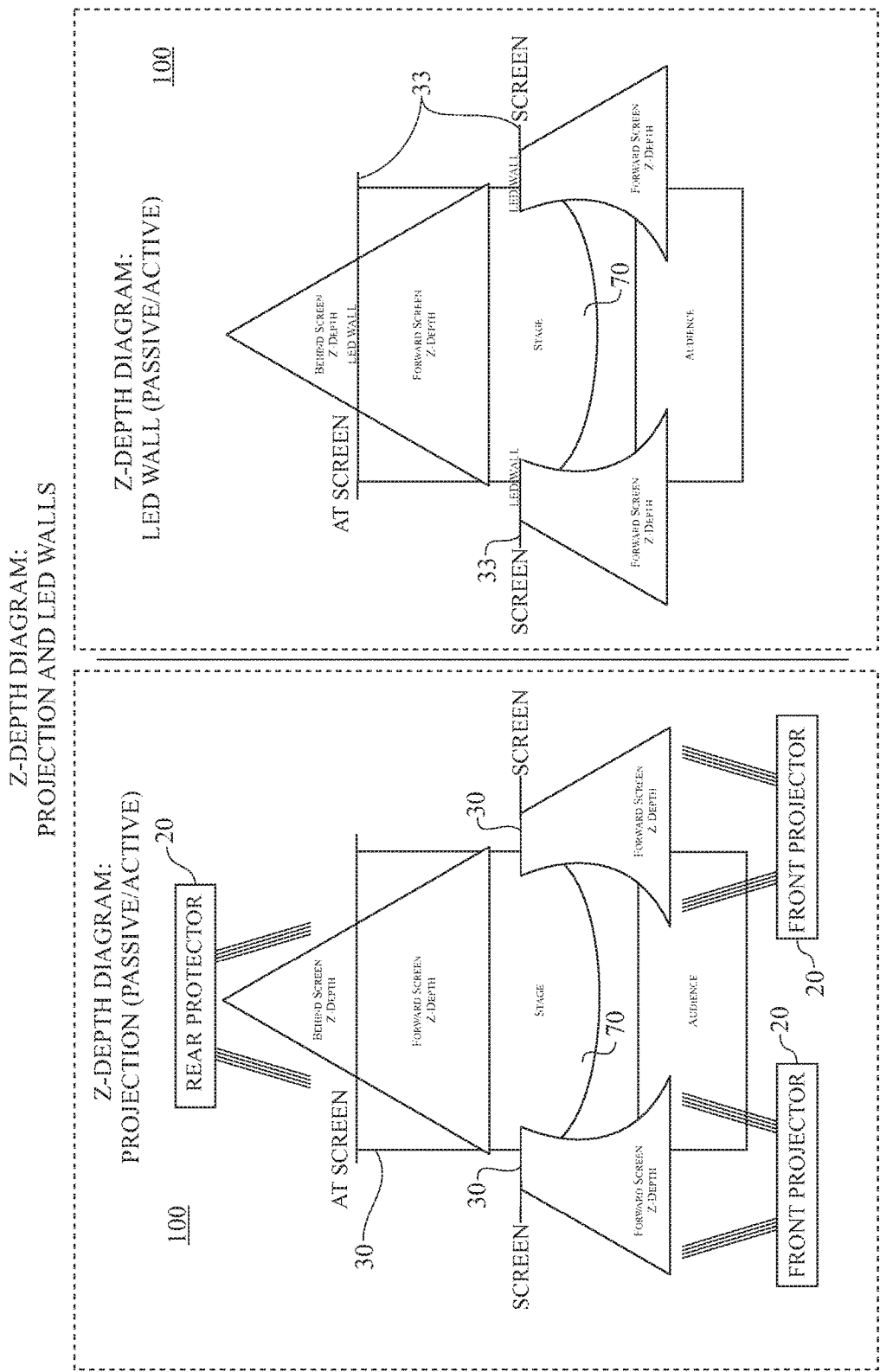
FIG. 5A is an overhead Z-depth illustration of another exemplary embodiment of a configuration and architecture for a plurality of front and rear screens and front and rear projectors used to present a real-time 3D stereoscopic display, showing example placement of the projectors, the screens on the stage, and the location of the audience.
FIG. 5B is an overhead Z-depth illustration of another exemplary embodiment of a configuration and architecture for a plurality of front and rear screens created by an LED wall used to present a real-time 3D stereoscopic display, showing example placement of the LED wall on the stage, and the location of the audience.

Once the desired 3D screen size, or 3D screen sizes are assembled from a plurality of LED panels, the LED panel structures, or walls, are strategically positioned to provide the display and visual to the audience. While one LED wall can be used, multiple passive LED walls can also be positioned to create a similar structure and architecture as shown in FIG. 5B, but without using multiple screens, filters, and/or multiple projectors. By reducing the number of system or projection components, there will be a reduction in problems that may be caused by component failures or malfunctions.

Moreover, as a further advantage when using LED panels 33, luminosity is increased which will counteract the "washout" effects that occur with bright stage lighting. This allows a brighter image to be displayed from the LED panels 33 and thus displayed to and seen by the audience. It should be noted that with a passive LED wall structure, there is still the need to have a media (or content) server, as well as the need for the audience to wear passive glasses 90 (again, as with the above examples, such glasses may be either circular or linearly polarized).

Example 3—Active Projection

As compared to the passive projection embodiment described above, using active projection with multiple screens 30 and multiple projectors 20 is a much simpler structure because, similar to the passive LED wall 33, there is less equipment required to create the active projection embodiment. Active projection requires use of both "active" projectors 20, as well as having the audience wearing "active" glasses 90. However, the active projection embodiment does not require separate left-eye and right-eye projectors, nor is there the need for polarized filters at the projectors or polarized glasses for the audience. Accordingly, the number of projectors 20 needed for an active embodiment as compared to the passive embodiment is generally reduced by half.

Similar to the passive projection embodiment, and as illustrated in FIG. 5A, stereoscopic 3D projection screens are strategically positioned at the front and/or rear of the stage 70 to create the framework (or set outline) for the stage. A show control server 40 with multiple outputs and frame-sync capability allows for two separate channels to be projected (e.g., content streams: still and moving content) for a left eye and a right eye stream. In another active system embodiment, the projection and control server 40 could be displaying a single stream having both left eye and right eye components.

The projection content may be readily, and specifically designed for each show's specific requirements and the production's needs. For example, each show will likely have different set designs, as well as there will be theatre specific and stage specific dimensions, measurements, and configuration constraints. Moreover, each theatre and stage set up will generally result in a different audience sweet spot that can be accounted for in the programming of the processor software and projection metrics.

Example 4—Active LED Wall

For an active LED wall embodiment, multiple active stereoscopic 3D LED panels or tiles are connected together side-by-side and top-to-bottom, similar to the passive LED wall, in order to build the desired screens and specified screen sizes. As described above for the passive LED wall embodiment, the active LED panels 33 are driven by software that is well-known and is typically provided with the LED panels or tiles.

Once the desired screens and specified sizes are all assembled, one or more of the active 3D LED walls/panels are strategically placed at the front, side, and/or back of the stage 70 to create a screen configuration, in one embodiment as shown in FIG. 5B. Again by using 3D LED wall instead of projectors and separate screens, a reduction in equipment and components can be achieved. More specifically, by using one or more 3D LED walls 33, the projectors 20 are not needed, nor are the multiple projectors and related filters.

Through use of the active LED wall technology, an interesting and unique frequency element is available to provide additional display information or content capability, and thus further opportunities for presenting enhanced display content to the audience. More particularly, through use of 240 Hz display stream, the data or content stream can be divided into left eye and right eye streams at 60 Hz each, which allows for use of the remaining 120 Hz data stream for supplementary content. One such usage could be for those audience members who may be located outside of the theatre or stage "sweet spot." Such supplementary display content will allow for a better perspective of the 3D content outside of the sweet spot, and thus enhance the visuals to a larger segment of the viewing audience.

As with the passive LED wall, the active LED wall has greater luminosity, and thus is able to counteract certain adverse lighting effects that may be caused by other stage lighting. Again, the LED wall allows for a brighter image to be displayed and seen by the audience. The active LED embodiment still requires a media or content server, and in addition, in view of the active LED display, the audience members will need to wear active 3D glasses 90. Such equipment does add certain costs to the production. As described above, while there are certain additional costs for the active glasses 90, the LED wall does alleviate the need for other equipment and costs associated with a projection embodiment, including a reduction in the number of projectors 20 required (there is no need for left eye and right eye specific projectors). Thus certain cost trade-offs are available to the production company when using an active LED wall configuration.

Figure 4:
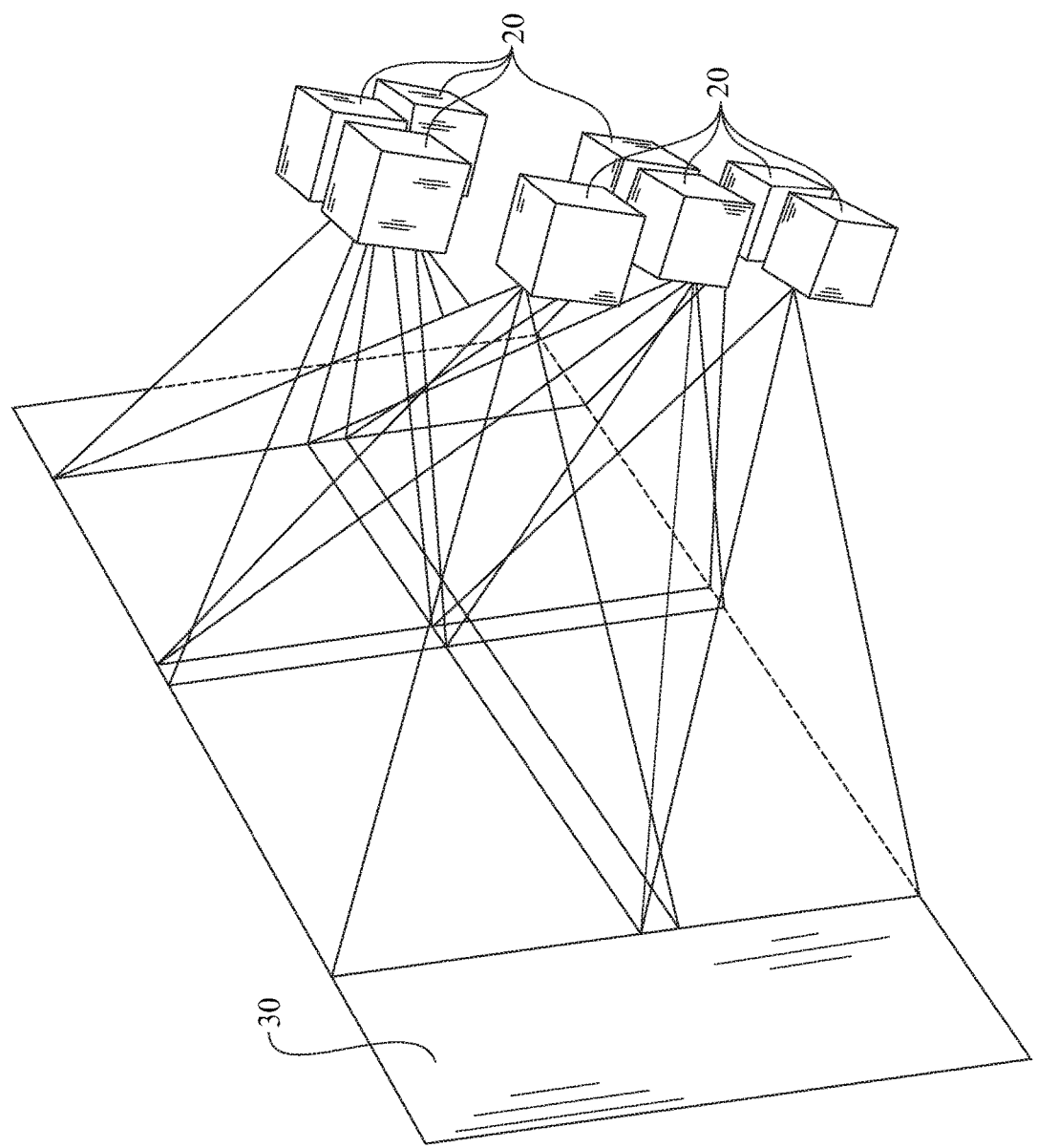
FIG. 4 is a perspective view of an exemplary embodiment of a configuration and architecture for a multiple projector, passive setup, used to present a real-time 3D stereoscopic display.

Certain of the above examples are illustrated in the attached drawings and figures. In one exemplary embodiment, as illustrated in FIGS. 1A, 1B, and 5A, a plurality of screens 30 and projectors 20 may be positioned at the rear and sides of the stage 70. The projectors 20 are positioned in pairs to present left eye/right eye content. As further shown in FIG. 4, four pairs of projectors, top to bottom pairs, are used for the stage set 70. More particularly, the FIG. 4 illustration is an example of how four pairs of projectors 20 are strategically placed and configured to create a seamless, panoramic image. The screen display for the FIG. 4 embodiment is for a screen having dimensions of approximately 16 feet×30 feet. As noted, this example shows eight projectors 20 are placed into four quadrants, with each quadrant using two projectors (e.g., left-eye and right-eye). All "left-eye" projectors are frame-blended and stitched together using calibration software, and similarly all "right-eye" projectors are frame-blended and stitched together using calibration software.

Once the left-eye and right-eye configurations have been established, the two projections are superimposed to create a single image or display. Circular polarized (glass) filters 21 are placed in front of each projector lens. For better image display, at least 30,000 lumen projectors are used to provide appropriate levels of display brightness and to overcome some of the luminosity lost from the polarizing filters used at the projector and the audience glasses. Such levels of projector lumen power are also needed to offset the loss of luminosity due to certain stage lighting.

Figure 6:
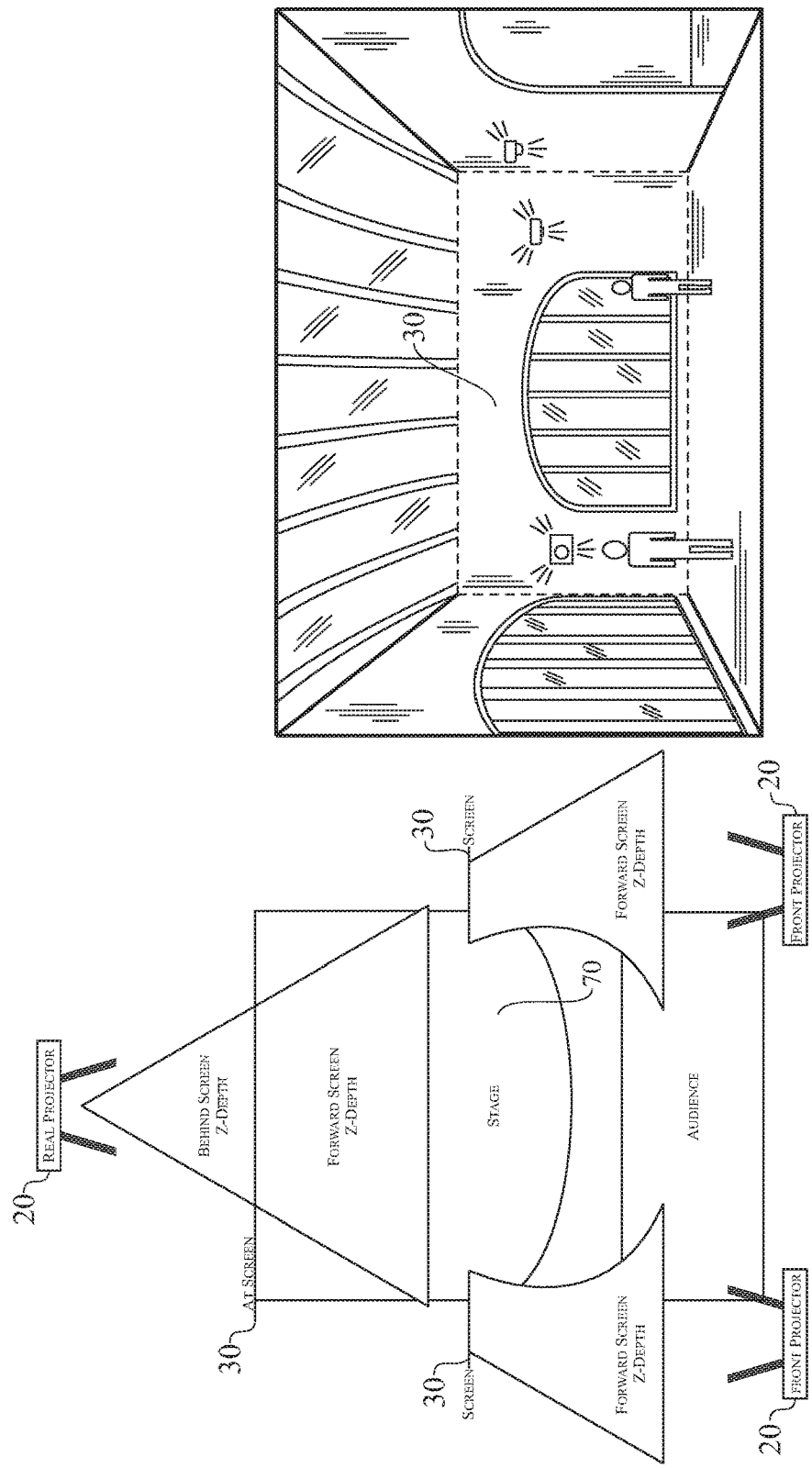
FIG. 6 is an overhead illustration of another exemplary embodiment of a configuration and architecture for a plurality of screens and projectors used to present a real-time 3D stereoscopic display, and further showing an example image of the main screen stage scene with the 3D display being projected.
Figure 7:
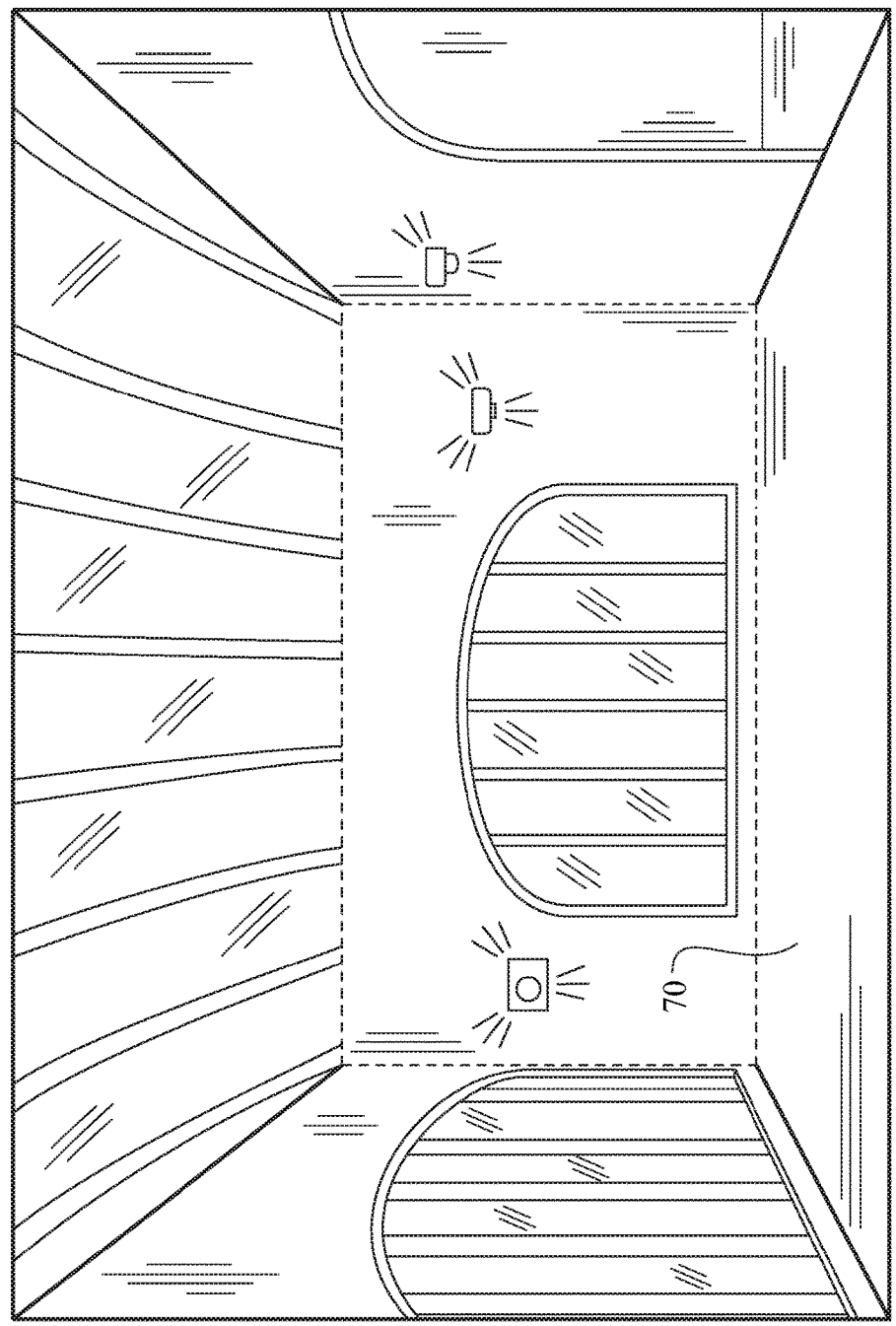
FIG. 7 is an example image of an anaglyph 3D version of the stage scene showing an example of the 3D stereoscopic stage set display using the real-time 3D stereoscopic projection system.

While the FIG. 5A is an example of a projector configuration used to create the display shown in FIGS. 6 and 7, the system 100 is highly flexible and may be used to create and display most any desired set using content set up and stored in the digital media server. As to be expected for different theatres, stage dimensions and configurations, and various sets, there will be a need to vary and refine the particular projectors, screen number and size, and arrangement of the screens, media servers, frame-blending, projection mapping, as well as other specific setup items for each individual show specifications and requirements.

FIGS. 5A and 5B also illustrate from an overhead view how the stereoscopic 3D effect works utilizing z-space depth perception. In more particularity, for an audience member viewing the main screen at the back of the stage, the image is projected from a single or multiple projectors 20 set up behind the main screen. The main screen image is designed in a "V" formation, so that the "behind-screen depth" provides a forced depth or distance perception. The "at-screen depth" is set and aligned with the on-stage performers to create a realistic scene look that correlates to the on-stage position of the performer or performers. Finally, the "forward-screen depth" begins at the position aligned with the at-screen depth and also extends onto the stage towards the audience, and accordingly seeming to envelope the on-stage performers. The positioning of the forward/on-stage screens should be set to maximize the performer on-stage space.

As shown in FIG. 6, the sides of the room displayed on the stage, are outlined in yellow as being the forward-screen depth, which is aligned geometrically with the at-screen depth, shown outlined in red. The behind-screen depth is illustrated by the windows at the back of stage and viewed through the at-screen depth.

In a further embodiment, and using two additional screens, set flexibility can be incorporated by creating performer entrances and exits from the side of the stage 70 while also helping to extend the set into the audience, and thus creating a more immersive experience for the audience members. As shown in one example in FIG. 8, the use of front and rear screens 30, and front and rear projection 20 provides a visual that appears to immerse the audience into the stage and set. The FIG. 8 example shows both an overhead view of the placement of the front and rear screens 30, along with the stage wings located behind the front screens, and also shows an example of a production display across the front and rear screens that appears to envelope the audience. By way of one further example, an outdoor scene would benefit from having further options for entering or exiting the set, as shown in FIG. 8, and thereby provide enhanced depth visuals for the audience.

While preferred embodiments of the inventive systems have been described and disclosed, in particular with reference to certain figures and exemplary embodiments of several architectures for placement and positioning of a plurality of screens and projectors, such exemplary representations are not to be construed as limiting the scope of application of the inventive methodologies or systems. More particularly, in addition to the disclosed and described systems, and the four example embodiments for passive and active projection, and the use of 3D LED walls, different architectures and structures may be used for different stages or theatres, including placing additional projection screens other than as illustrated.

It will be recognized by those skilled in the art that other modifications, substitutions, and/or other applications are possible and such modifications, substitutions, and applications are within the true scope and spirit of the present invention. It is likewise understood that the attached claims are intended to cover all such modifications, substitutions, and/or applications.

What is claimed is:

1. A system for creating and displaying real-time, three-dimensional stereoscopic projections for use in live events having a stage section, said system comprising:
   a. a plurality of on-stage screens positioned to provide a fully aligned behind-stage image, an at stage-stage image, and a forward-stage image;
   b. a plurality of projectors arranged in a plurality of pairs, and positioned to project consistent content images on said plurality of on-stage screens; and
   c. at least one processor controlling said plurality of projectors;
   such that said stage display observable by an audience is dynamic, interactive, updated in real-time, and as a result of the positioning of the behind-stage image, the at stage-stage image, and the forward-stage image, the stage display to surrounds on-stage performers, and immerses audience members in said stage section.

2. The system for creating and displaying real-time, three-dimensional stereoscopic projections of claim 1, wherein said plurality of projectors is four pairs of interlaced projectors.

3. The system for creating and displaying real-time, three-dimensional stereoscopic projections of claim 1, wherein said projectors are passive projectors.

4. The system for creating and displaying real-time, three-dimensional stereoscopic projections of claim 3, further comprising circular polarizing filters for each of the passive projectors.

5. The system for creating and displaying real-time, three-dimensional stereoscopic projections of claim 3, further comprising linear polarizing filters for each of the passive projectors.

6. The system for creating and displaying real-time, three-dimensional stereoscopic projections of claim 1, wherein said projectors are active projectors.

7. The system for creating and displaying real-time, three-dimensional stereoscopic projections of claim 1, wherein content of said set display presented in part as said fully aligned behind-stage image, the at stage-stage image, and ache forward-stage image is fully modifiable for presentation specifications, to suit specific stage physical constraints, and tuned to specific audience viewing positions.

8. A system for creating and displaying real-time, three-dimensional stereoscopic projections for use in live events having a stage section, said system comprising:
   a. a plurality of on-stage light emitting diode (LED) displays interconnected and positioned to provide a fully aligned behind-stage image, an at stage-stage image, and a forward-stage image; and
   b. at least one processor controlling said plurality of LED displays;
   such that said stage display observable by an audience is dynamic, interactive, updated in real-time, and as a result of the positioning of the behind-stage image, the at stage-stage image, and the forward-stage image, the stage display to surrounds on-stage performers, and immerses audience members in said stage section.

9. The system for creating and displaying real-time, three-dimensional stereoscopic projections for use in live events, of claim 8, wherein said LED displays are passive displays.

10. The system for creating and displaying real-time, three-dimensional stereoscopic projections for use in live events, of claim 8, wherein said LED displays are active displays.

11. The system for creating and displaying real-time, three-dimensional stereoscopic projections for use in live events, of claim 10, wherein said active LED displays are operated at an even fraction of a standard full operational frequency.

12. The system for creating and displaying real-time, three-dimensional stereoscopic projections for use in live events, of claim 10, wherein said active LED displays are operated at ½ operating frequency of said active LED display standard full operational frequency.

13. The system for creating and displaying real-time, three-dimensional stereoscopic projections for use in live events, of claim 10, wherein said active LED displays are operated at ½ operating frequency of the active LED display standard full operational frequency.

14. The system for creating and displaying real-time, three-dimensional stereoscopic projections for use in live events, of claim 8, wherein content of said set display presented in part as said fully aligned behind-stage image, the at stage-stage image, and the forward-stage image is fully modifiable for presentation specifications, to suit specific stage physical constraints, and tuned to specific audience viewing positions.

* * * * *